Nov. 14, 1939.　　　　　M. STARK ET AL　　　　　2,179,565
RADIO TUBE TESTER
Filed March 24, 1938　　　3 Sheets-Sheet 1

Inventors.
Milton Stark.
Frederick Sutton.

Inventors.
Milton Stark.
Frederick Sutton.

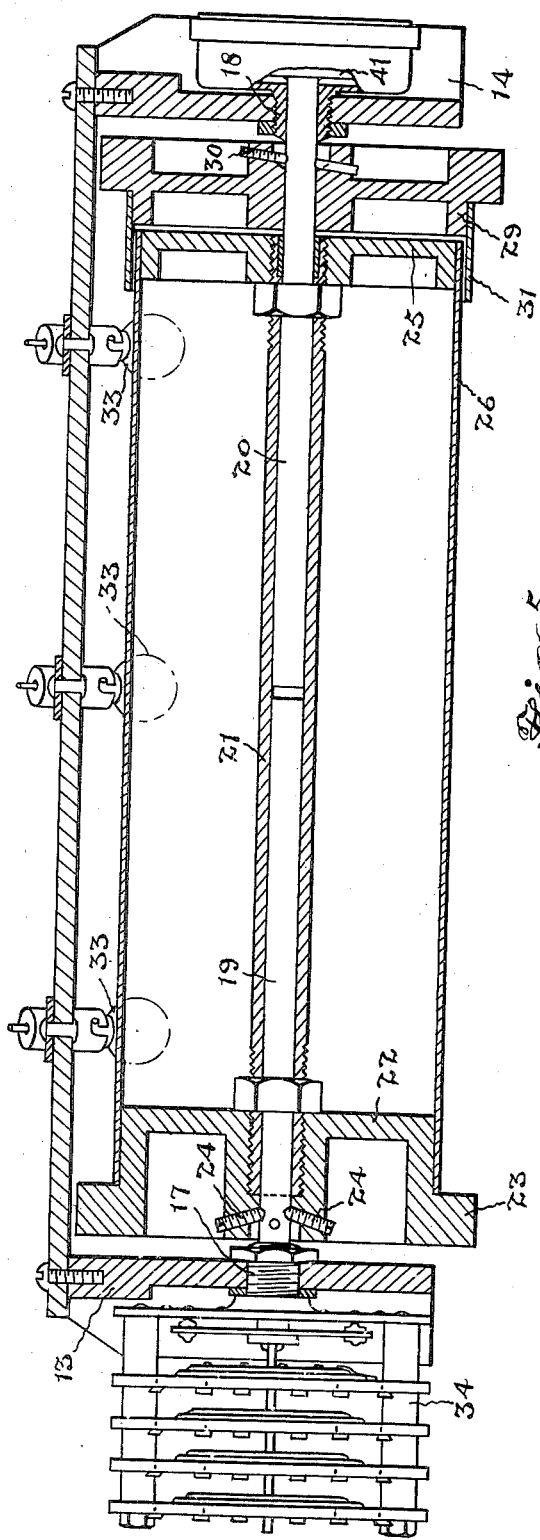

Patented Nov. 14, 1939

2,179,565

UNITED STATES PATENT OFFICE 2,179,565

RADIO TUBE TESTER

Milton Stark and Frederick Sutton, Toronto, Ontario, Canada, assignors to Stark Tube Company, Toronto, Ontario, Canada Application March 24, 1938, Serial No. 197,779

8 Claims. (Cl. 250—27)

The present invention is devised for the purpose of enabling the rapid and accurate testing of various types of radio tubes and the principal objects of the invention are, to provide a testing device of a compact and easily portable form which may be operated in a very simple manner to obtain the necessary connections to suit various known types of tubes and further, to enable the ready altering of the device from time to time to suit the requirements of new tube developments without depriving the owner of the instrument of its use for prolonged periods when scientific and complicated changes in the wiring arrangements may be required.

The principal features of the invention consist in the novel arrangement of a selector switch mounted upon a rotatable indicator cylinder provided with indicia representing the types of tubes to be tested and the selection of the socket to be used for the test together with other operating indications, the switch being wired through detachable connections with the permanent socket and other fixtures, and further, in the novel arrangement of a shunt control mounted on a member rotatable independent of the aforesaid cylinder and having its wiring with the permanent fixtures detachably arranged so that both the cylinder and shunt mechanisms may be readily detached from the permanent fixtures and replaced by revised control and indicator devices.

In the accompanying drawings, Figure 1 is a plan view of the indicator and fixture plate of the improved tube tester.

Figure 5 is an enlarged longitudinal plan and part sectional view of the indicator cylinder and rotatable shunt control device.

Figure 1:
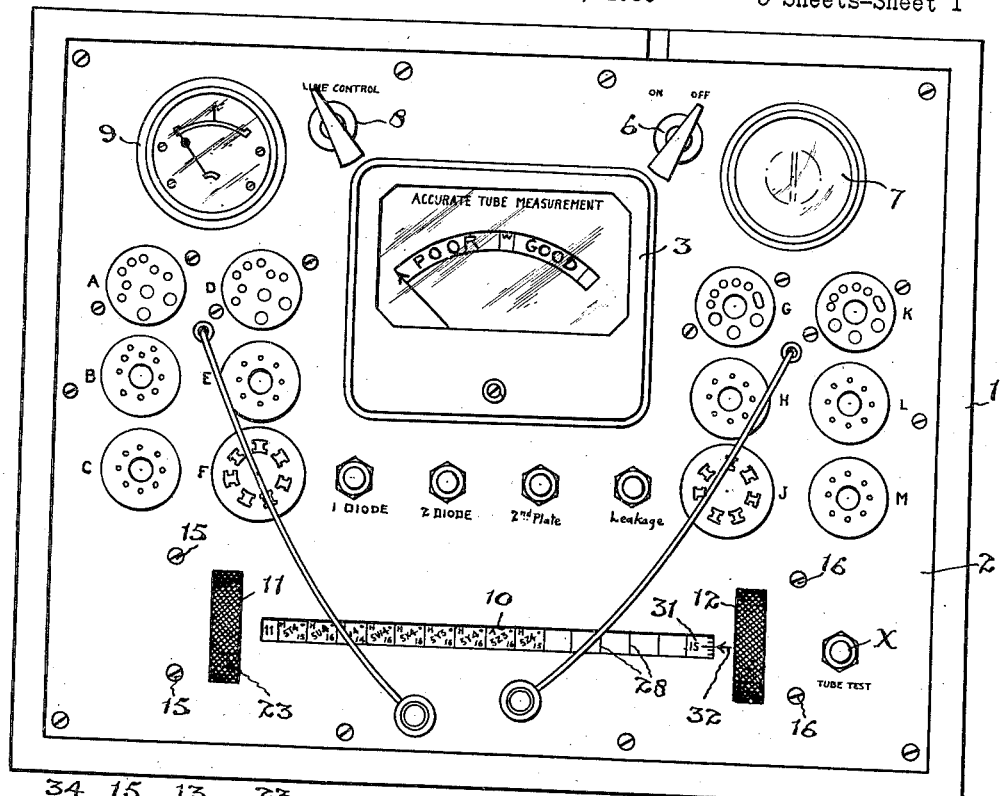

Numerous forms of radio tube testing equipment have been devised and the use of certain instruments for testing the various elements of the tube are now standard practice and this invention is not directed toward the use of any particular individual testing instrument, but is directed to a novel assembly of instruments and fittings in association with a novel structure of indicating mechanism which will enable tests to be made to determine the efficiency of all elements of a wide range of tube structures which may be readily changed without disturbing the arrangement of the permanent instruments and fixtures.

Referring to the accompanying drawings, the instrument case 1, which is here shown of rectangular form, has mounted therein a plate 2 upon which is mounted in a centralized position the "accurate (tube) measurement" meter 3.

Arranged at one side of the meter 3 are the main current switch 6 and the neon test tube 7 and on the other side of the meter 3 is the line control switch 8 and its balancing meter 9.

Below the meter 9 are arranged a plurality of tube sockets which have the indicating letters A, B, C, D, E, F, and below the tube 7 are other tube sockets indicated by the letters G, H, J, K, L, M.

Below the meter 3 are arranged switch buttons indicated as "1 diode", "2 diode", "2nd plate" and "Leakage". These buttons are coloured in different contrasting colours. Below the above-mentioned fixtures there is a long slot 10 cut in the plate 2 and adjacent to the ends of the said slot are transverse openings 11 and 12. A "tube test" switch button X is also arranged on the plate 2.

Brackets 13 and 14 are rigidly secured to the underside of the plate 2 by screws 15 and 16 respectively. Bushings 17 and 18 are rigidly secured in axial alignment in said brackets and in these bushings are respectively journalled the aligned spindles 19 and 20.

A sleeve 21 rotatably mounted on the aligned spindles 19 and 20 supports the inner ends of said spindles. This sleeve is threaded externally at the ends and mounted on one end thereof is the hub 22 which is provided with a knurled flange 23 which projects slightly through the slot 11 in the plate 2 so that it may be readily rotated by the thumb or finger. The hub 22 is keyed to the spindle 19 by set screw 24.

A hub 25 is mounted on the opposite threaded end of the sleeve 21.

A thin cylindrical tube 26 of cardboard or other suitable material is mounted upon and extends between the hubs 22 and 25 and its surface is divided into small rectangular spaces by the equally spaced longitudinal lines 27 and the longitudinally spaced circumferential lines 28. The circumferential spacing of the longitudinal lines is equal to the width of the slot 10 in the plate 2 and numerals or markings are arranged in these spaces to indicate various known models or types of radio tubes and to indicate the use of certain test switches.

In one corner of each of the aforesaid index spaces there is arranged a letter to indicate the particular socket on the instrument plate 2 in which the indicated tube is to be placed for testing and in the opposite corner there is placed an index numeral to indicate the "shunt" numeral to be used. A coloured dot indicates the test switch button required to be operated in the testing of the particular tube indicated in the index space.

A hub 29 is mounted on the spindle 20 between the hub 25 on the end of the sleeve 21 and the bushing 18 in the bracket 14 and it is keyed to the spindle by a set screw 30.

A short cylindrical tube 31, of slightly larger diameter than the tube 26 is mounted on the hub 29 and overlaps said cylinder, and the hub is provided with a knurled flange 23 which projects slightly through the slot 12 in the plate 2 to enable its being turned. The surface of the cylinder 31 is provided with longitudinal lines equally spaced and indicating divisions from 0 to 100, and an arrow mark 32 on the plate 2 at the end of the slot 10 indicates the point of setting of these index lines by the rotation of the cylinder 31.

Suitable light bulbs 33 are arranged along the length of the slot 10 under the plate 2 to illuminate the surface of the index cylinders.

Figure 2:
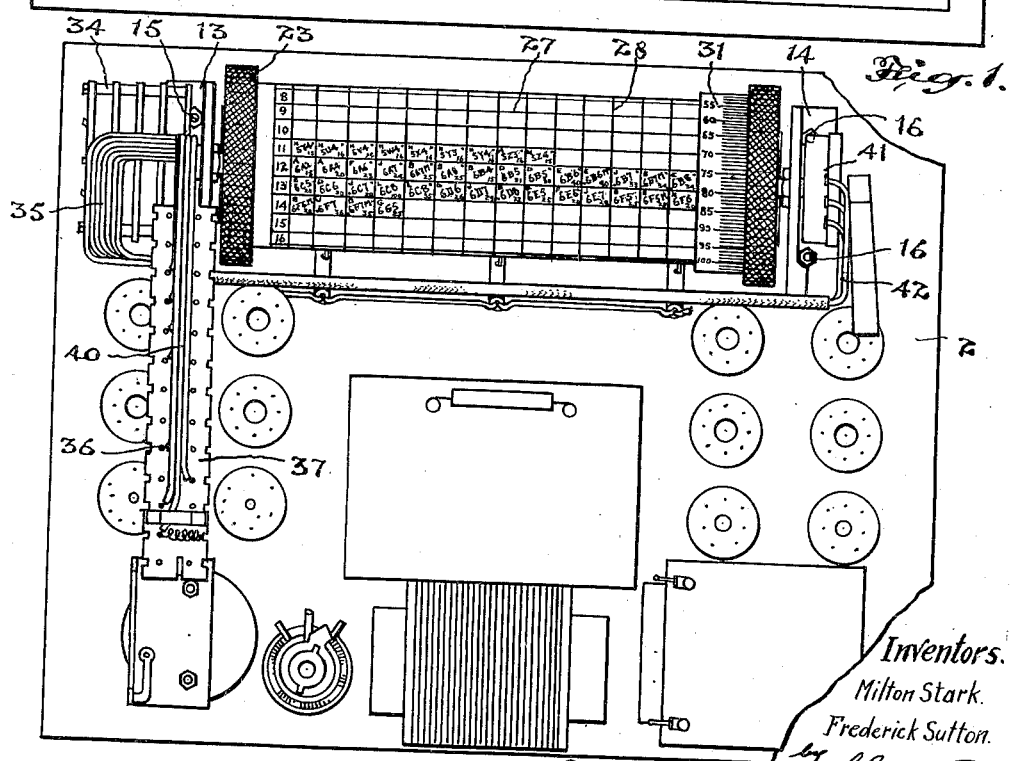
Figure 2 is an underside plan view of the fixture plate showing particularly the arrangement of the indicator cylinder and shunt switch members.
Figure 3:
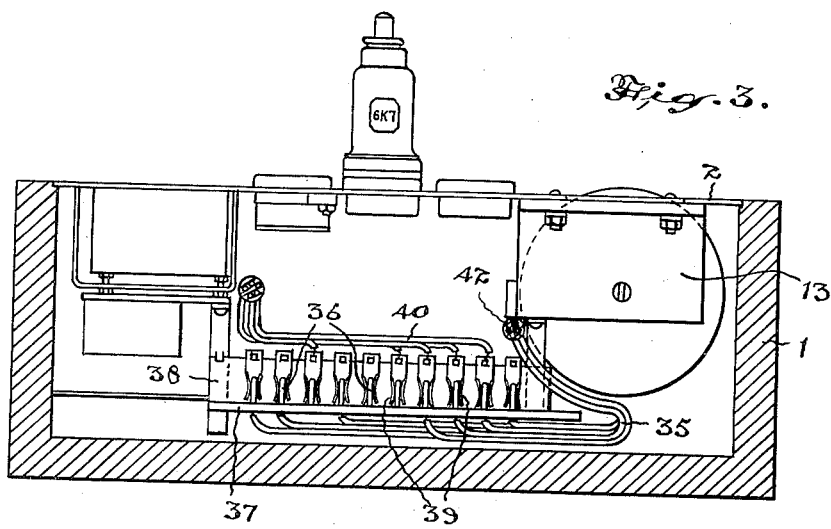
Figure 3 is a cross sectional view through the case of the testing instrument showing the parts therein in end elevation.
Figure 4:
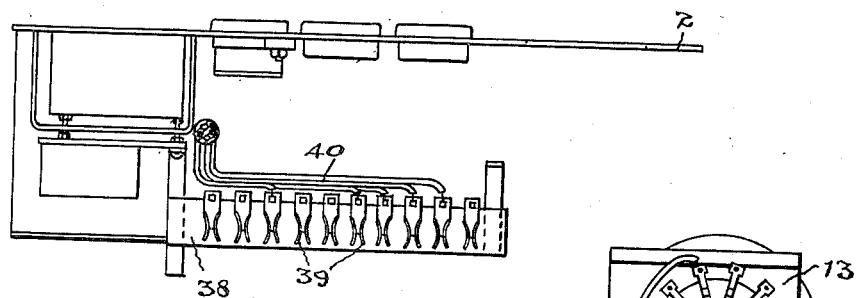
Figure 4 is an end elevational detail showing the manner of disconnecting the rotatable switch members.
Figure 6:
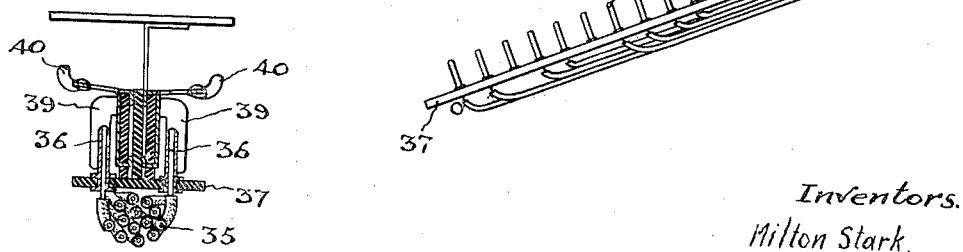
Figure 6 is an enlarged sectional elevational view of the detachable switch elements.

Supported by the bracket 13 and co-axially arranged with the spindle 19 is a suitable multiple switch contact frame 34 provided with a multiplicity of fixed contacts to which are connected the wiring leads 35, shown in Figures 2, 3 and 4. The movable contacts to co-operate with the fixed contacts on the frame 34 are mounted upon the spindle 19 and are rotated thereby to make the desired contacts in connection with the various rows of tube indices on the cylinder 26. The construction of the switch contacts is not illustrated in detail as any suitable form may be used and several types of such switches are available for use.

The wiring leads 35 are of a flexible type and they are connected to a plurality of individual plug contacts 36 mounted on a plate 37 of insulating material. The contacts are arranged preferably in two parallel rows and are equally spaced apart.

A bar 38 rigidly mounted within the case 1, and preferably formed of spaced strips of insulating material, has arranged on either side thereof and equally spaced apart, a plurality of spring socket contacts 39 which are adapted to engage simultaneously with the plug contacts 36 mounted on the plate 37. These fixed contacts are wired by the leads 40, secured to the contacts on the inward sides of the spaced strips, to the various fixed sockets, switches and other instruments used in making tube tests. The particular wiring arrangement of these leads and instruments, etc., is not shown as the hook-up is entirely scientific and technical and is not requisite to the understanding of the present invention.

A rotary shunt control 41 of a suitable design and construction is mounted on the bracket 14 and its moving elements are mounted on the spindle 20 to which the index cylinder 31 is secured. The fixed contacts of the shunt are connected through the leads 42, see Figure 2, to contacts on the plate 37.

It will be readily appreciated that when it may be found desirable to add new indices to the cylinder 28 and corresponding wiring alterations through the development of other forms of tubes, the entire index and switch mechanism may be removed by separating the movable plug connections on the plate 37 from the fixed socket connections 39 on the bar 30 and by the removal of the fastening screws 15 and 16 holding the brackets supporting the index cylinders in position and a revised set of index members and plug contacts may be inserted to replace the one removed without disrupting the fixed arrangements of instruments and their wiring.

The construction and arrangement of the main index cylinder with the separate shunt control cylinder and their co-related parts presents an extremely novel and useful apparatus which incorporates the entire assembly of test apparatus in a very compact device having a practically universal range so that any known radio tube may be tested with the device and without the necessity of a knowledge of the intricate scientific and technical requirements.

It will be noted that the tube indications arranged upon the cylinder 26, are preferably arranged in alphabetical and numerical sequence so that the selection of the proper indices by the operator desiring to test certain tubes may be rendered extremely simple. This feature combined with the automatic connection of the various test apparatus produces a device which is very flexible and highly desirable.

What we claim as our invention is:

1. In a radio tube tester, the combination with an arrangement of standard tube testing instruments and fixtures, and a selector switch having a plurality of fixed contacts wired to selected arrangements of said instruments and fixtures, of a rotor having a plurality of contact members to co-operate with said fixed contacts and having a series of longitudinal rows of radio tube indices located on the peripheral surface thereof in predetermined locating relation to the second-mentioned contact members, and locating means fixed in relation to the first-mentioned set of contacts in co-operating relation to the rotary periphery for individually locating said rows in relation to the said first-mentioned set of contacts in accordance with the characteristics of the tube to be tested.

2. In a radio tube tester, the combination with an arrangement of standard tube testing instruments and fixtures, and a selector switch having a plurality of fixed contacts wired to selected arrangements of said instruments and fixtures, of a rotor having a plurality of contact members to co-operate with said fixed contacts and having a cylindrical member carried by said rotor, the surface of which is divided into a plurality of longitudinal and peripheral rows of tube indices arranged in fixed relation to said rotor contacts, each of said indices having certain shunt and co-operative fixture indexes.

3. A radio tube tester as claimed in claim 1 having detachable connections interposed in the wiring between the selector switch mechanism and the fixed instruments and fixtures and said switch mechanism and indicia-carrying rotor comprising a readily demountable unit.

4. A radio tube tester as claimed in claim 1 having a fixed bar provided with a plurality of contact members mounted thereon wired to said fixtures and instruments, and a plate having a plurality of contacts mounted thereon to register with and detachably engage said fixed contacts, the contacts on said plate being wired to the fixed contacts of said selective switch means, and means forming a readily detachable rotary mounting for the said indicia-carrying rotor and co-operating switch means.

5. In a radio tube tester, the combination with an arrangement of standard tube testing instruments and fixtures, of a pair of bearing supports rigidly and detachably mounted, a pair of spindles co-axially journalled in said bearing supports, a cylindrical indicator mounted on one of said spindles and having radio tube indicia thereon, a selector switch rotor mounted on the spindle carrying said indicator, selector switch contacts carried by said bearing support and wired to certain of said fixtures and instruments, a shunt control indicator mounted on the other of said spindles, a rotor of a shunt control mounted on the latter spindle, and fixed shunt contacts mounted on said bearing support and wired to certain of said instruments and fixtures, said apparatus forming a pre-assembled unit insertable and removable in its entirety.

6. A radio tube tester as claimed in claim 5 having detachable contacts in each of the wires leading from said selector and shunt controls whereby the entire unit together with the entire electrical contacts may be quickly detached from the main tube-testing unit for repairs, replacement or adaptation to the specifications of later type tubes.

7. A radio tube tester as claimed in claim 5 having a plug contact connected to each of the wires leading from the selector and shunt controls, an insulator plate supporting said plug contacts in fixed spaced relation thereon, an insulating member rigidly mounted in relation to said fixtures and instruments, and a plurality of socket contacts rigidly mounted on said insulating member to receive all of said plug contacts simultaneously, said socket contacts being permanently wired to said fixtures and instruments.

8. In a radio tube tester, the combination with an arrangement of standard tube testing instruments and fixtures, of a pair of bearing supports rigidly and detachably mounted, a pair of spindles coaxially journalled in said bearing supports, a sleeve rotatably mounted on and embracing said spindles between their bearing supports and secured to one of said spindles, a hub mounted on each end of said sleeve each having a knurled flange, a cylinder mounted on and extending between said hubs and having radio tube indicia marked thereon, a hub mounted on and secured to the other of said spindles and having a knurled flange and an indicator cylinder overlapping one end of the aforesaid cylinder, a selector switch rotor mounted on the first of said spindles, a shunt control rotor mounted on the latter of said spindles, fixed selector switch contacts engaging said rotor wired to certain instruments and fixtures, and fixed shunt contacts wired to certain of said instruments and fixtures.

MILTON STARK.
FREDERICK SUTTON.